United States Patent [19]

Blessing et al.

[11] Patent Number: 4,781,078
[45] Date of Patent: Nov. 1, 1988

[54] LOCKING DIFFERENTIAL WITH ELECTROMAGNETIC ACTUATED CLUTCH

[75] Inventors: Martin G. Blessing, Fort Wayne; Charles F. Heine, New Haven; Richard L. Pifer, Fort Wayne, all of Ind.

[73] Assignee: Dana Corporation, Toledo, Ohio

[21] Appl. No.: 9,831

[22] Filed: Feb. 2, 1987

[51] Int. Cl.⁴ .............................................. F16H 1/44
[52] U.S. Cl. ...................................... 74/711; 192/48.2
[58] Field of Search ................ 74/710.5, 711, 713, 74/714; 192/35, 93 A, 54, 70.21, 48.2, 48.7, 48.8

[56] References Cited

U.S. PATENT DOCUMENTS

| | | | |
|---|---|---|---|
| 3,323,389 | 6/1967 | Hause | 74/710.5 |
| 3,419,118 | 12/1968 | Allaben, Jr. | 192/35 |
| 3,448,636 | 6/1969 | Roper et al. | 74/711 |
| 3,572,165 | 3/1971 | Roper | 74/711 |
| 3,744,609 | 7/1973 | Miller | 192/84 A |
| 3,789,966 | 2/1974 | Miller | 192/35 X |
| 3,818,781 | 6/1974 | Goscenski, Jr. | 74/711 |
| 3,845,671 | 11/1974 | Sharp et al. | 74/710.5 |
| 3,869,940 | 3/1975 | Webb et al. | 74/711 |
| 3,886,813 | 6/1975 | Baremor | 74/710 |
| 4,022,084 | 5/1977 | Pagdin et al. | 74/711 |
| 4,030,581 | 6/1977 | Giometti | 192/35 |
| 4,031,780 | 6/1977 | Dolan et al. | 74/711 |
| 4,041,804 | 8/1977 | Clark | 74/711 |
| 4,048,872 | 9/1977 | Webb | 74/711 |
| 4,059,026 | 11/1977 | Stritzel | 74/711 |
| 4,266,445 | 5/1981 | Goscenski, Jr. | 74/711 |
| 4,290,321 | 9/1981 | Wilson | 74/711 |
| 4,357,840 | 11/1982 | Winzeler | 74/714 |
| 4,389,908 | 6/1983 | Dudek | 74/711 |
| 4,389,909 | 6/1983 | Goscenski, Jr. | 74/711 |
| 4,400,996 | 8/1983 | Schou | 74/650 |
| 4,412,459 | 12/1983 | Goscenski, Jr. | 74/711 |
| 4,455,596 | 5/1984 | Waters et al. | 192/54 X |
| 4,462,272 | 7/1984 | Roper | 74/711 |
| 4,535,651 | 8/1985 | Chambers | 74/711 |
| 4,554,845 | 11/1985 | Goscenski, Jr. | 192/93 A X |
| 4,645,049 | 2/1987 | Matsuda et al. | 192/54 X |
| 4,679,463 | 7/1987 | Ozaki et al. | 74/711 |

FOREIGN PATENT DOCUMENTS

| | | |
|---|---|---|
| 2920107 | 5/1979 | Fed. Rep. of Germany . |
| 76568 | 6/1977 | Japan . |
| 178040 | 4/1982 | Japan . |

Primary Examiner—Leslie A. Braun
Assistant Examiner—David Novais
Attorney, Agent, or Firm—Harold F. Mensing; Frank B. McDonald; Robert M. Leonardi

[57] ABSTRACT

An improved limited slip differential gear assembly for driving each axle of a pair of coaxially aligned vehicle axles at the same rotational speed or at relatively different rotational speeds as conditions require. The assembly includes an improved externally controllable clutch mechanism for preventing excessive relative rotation of the axles. The amount of the clutch force being applied to resist relative rotation may be varied independently of the relative rotational speed of the axles and also of the torque level in the gear assembly. Preferably the clutch mechanism is incorporated in a planetary wheel type differential and is activated electromagnetically. The clutch mechanism may include a cam operated supplemental clutch device for applying an additional clutch force in response to any continued relative rotation which may occur after the first clutching force has been applied by the electromagnet.

17 Claims, 3 Drawing Sheets

LOCKING DIFFERENTIAL WITH ELECTROMAGNETIC ACTUATED CLUTCH

BACKGROUND OF THE INVENTION

1. Technical Field

This invention relates to a limited slip differential mechanism for effectively transferring torque to both of a coaxially aligned pair of axles of a wheeled vehicle. More specifically it relates to a compact limited slip differential mechanism which includes an externally controllable electromagnetically operated clutch mechanism that provides a variable resistance to excessive relative rotation of the axles irrespective of the rate of relative rotation and of the output shaft torque level.

2. Prior Art

Many of the prior art differential gear mechanisms were not only bulky but were also excessively complicated and thus costly to manufacture. These problems were often compounded by the addition of various means to limit differential rotation of the vehicle axles automatically in the event of loss of traction between the road surface and one of the wheels. In most instances the amount of resistance to relative rotation provided by the automatically controlled slip limiting differentials was entirely dependent upon or directly proportioned to the rate of relative rotation and the output shaft torque level. Even though these devices were a vast improvement over open differentials, they did not satisfy all conditions. This was particularly true with respect to conditions involving incipient wheel slippage, low wheel slippage and low slipping wheel torque.

Accordingly, it is an object of this invention to solve these problem and provide a compact, durable and effective differential gear assembly which is economical to produce and is capable of controlling the resistance to differential rotation of the vehicle axles irrespective of the rate of their relative rotation and torque levels.

It is another object of this invention to more effectively control the resistance to differential rotation by providing an electromagnetically variable first force resisting differential rotation and a cam operated supplemental second force resisting any continuing differential rotation which occurs after the first force has been applied and for its duration.

SUMMARY OF THE INVENTION

The differential gear assembly disclosed herein is comprised of a gear driven differential case rotatably contained in a larger housing. A radially disposed planetary gear wheel is splined to one of a pair of coaxially aligned vehicle axles. It supports a plurality of pairs of meshed gears. One gear of each pair engages an annular gear formed on the inside of the differential case while the other gear of each pair engages a sun gear that is splined to the other axle. An electromagnetically operated clutch capable of being controlled from an external location is provided to limit relative rotation between the two axles. The level of resistance to relative rotation may be controlled irrespective of relative rotation. Preferably a cam operated supplemental clutch mechanism is incorporated in the clutch system to automatically apply additional side pressure against some of the clutch disks of the aforementioned clutch assembly in the event relative rotation continues after the electromagnet has been activated. The supplemental clutch mechanism is activated in part by the resistance resulting from the application of the first force and in part by any continuing differential rotation occurring during the duration of the first force.

The above mentioned objects and advantages and various other features of this invention will be understood best if the following description is read in conjunction with the accompanying drawings which illustrate two preferred embodiments.

DETAILED DESCRIPTION OF THE INVENTION

Figure 1:
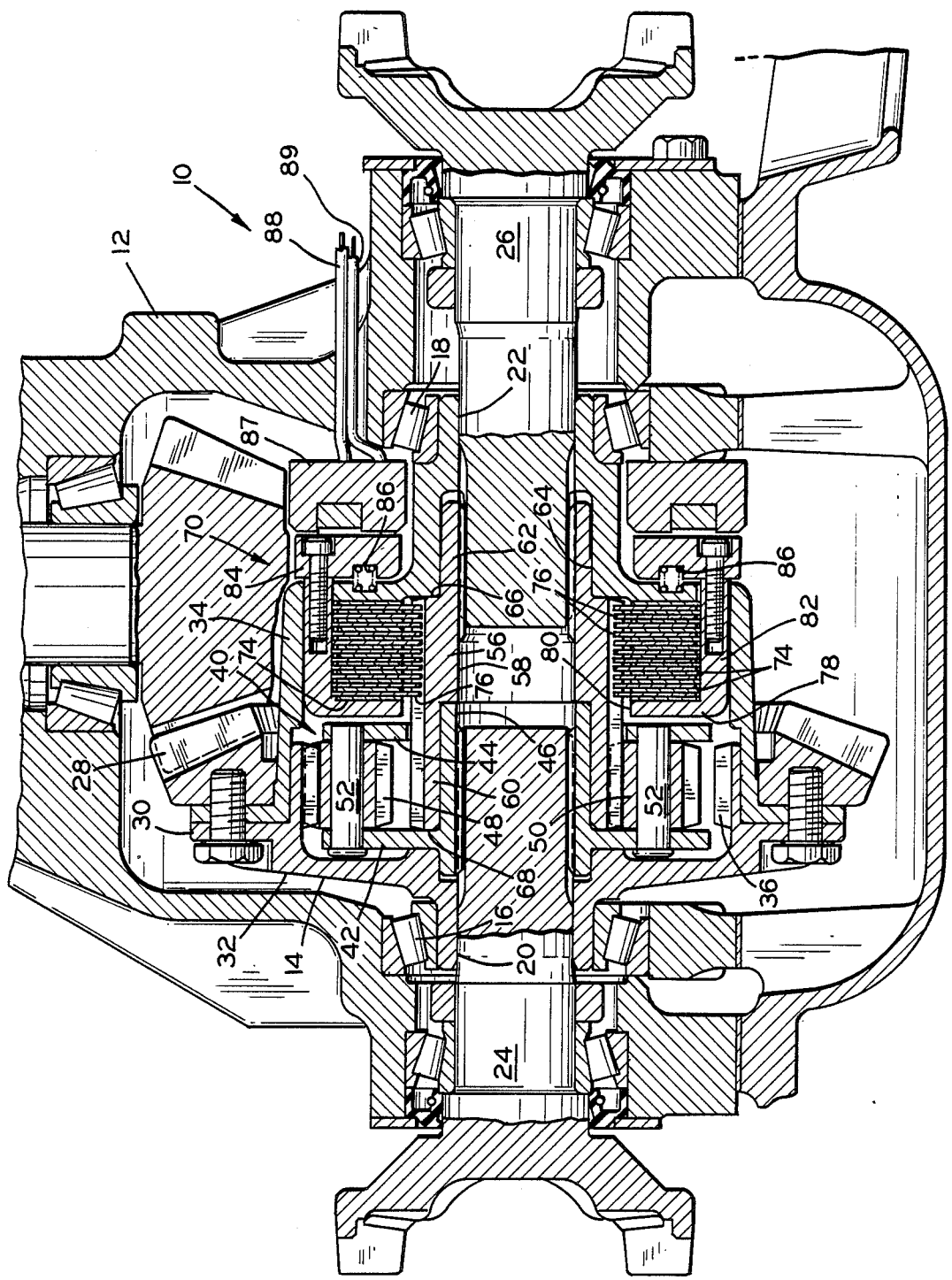
FIG. 1 is a sectional plan view of one embodiment of this invention taken along its centerline except for the planetary gear wheel assembly which is taken along line 1—1 FIG. 2.

Many of the elements and their functions are the same for both embodiments so for the sake of brevity they will be described in detail only with respect to the first embodiment. For ease of understanding similar parts will be given similar reference numerals.

Figure 2:
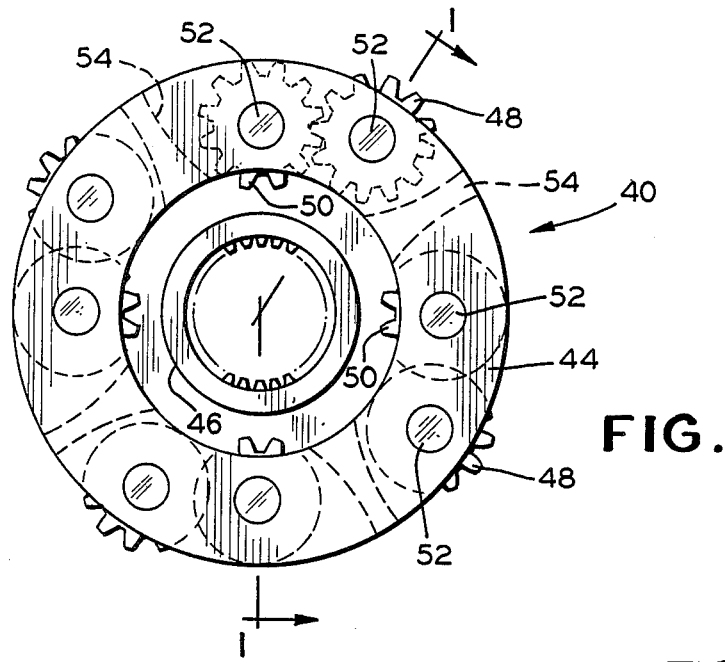
FIG. 2 is an enlarged right side view of the planetary gear wheel assembly of FIG. 1.

Referring to the drawings the differential gear assembly embodiment 10 illustrated in FIGS. 1 and 2 is comprised of an outer housing 12 containing a rotatable differential gear assembly case 14 mounted in a pair of coaxially disposed tapered roller bearings 16, 18 by means of hub sections 20, 22 extending from opposite ends of the case. The ends of coaxially aligned axles 24, 26 are journaled inside these hub sections. A pinion driven ring gear 28 is affixed to a radially disposed annular flange 30 on the periphery of the case. The case itself is made of two axially separable members 32, 34. The case member 32 on the left side of FIG. 1 has a large diameter circumferentially disposed annular gear 36 with inwardly facing parallel teeth integrally connected to the inside of the case member.

A radially disposed planetary gear assembly 40 is mounted coaxially inside of the annular gear 36. The wheel has two parallel side plates 42, 44 the left one of which is integrally connected to the left side of hub section 46 which in turn is connected to the end of left axle 24 by means of internal splines. The circular central portion of the right plate 44 is cut out to form an annular opening between it and the periphery of the adjoining right end of the hub 46. The side plates have a plurality of parallel planar inner face sections. Meshed pairs of planet gears 48, 50 are rotatably mounted on parallel pins 52 at the planar face sections. The side plates are cross connected by radially disposed web members 54 interposed between the pairs of planet gears. The thickness of the web members 54 increases in a radially inward direction.

One gear of each meshed pair, namely gear 48, is disposed closer to the periphery of the wheel than the other gear. These outer gears 48 all mesh with annular gear 36. The inner gear 50 of each pair is meshed with a sun gear 56 having a gear section which extends into the wheel through the annular opening in the right side plate 44.

The sun gear 56 has a generally cylindrical midsection 58 which lies between an integrally connected left end section 60 and an integrally connected right end section 62. The right end section of the sun gear is splined internally to the end of the right axle 26 and extends between this axle and a concentric bearing surface 64 recessed in the end of the right case member 34. At the junction of the right end section 62 and the midsection 58 there is a radially disposed annular shoulder 66 which extends between the offset peripheries of the adjoining sections 58, 62 and bears against a corresponding annular shoulder on the right case member 34. The left end section 60 of the sun gear 56 is journaled on the planetary wheel hub 46 and thus is free to rotate about it. The radially disposed face 68 on the left end of section 60 bears against the inner wall of left side plate 42. The gear teeth on the outside of the sun gear 56 extend from its left end to the right end of its midsection 58.

An electromagnetically operated clutch assembly 70 is incorporated in the differential to provide a variably controllable resistance to the relative rotation of the coaxially aligned output shafts or axles 24, 26. Clutch assembly 70 includes a wet clutch pack comprised of a plurality of laterally movable annular clutch disks concentrically stacked together side by side. Alternate disks 74 and intermediate disks 76 of the clutch pack are linked respectively by one or more components to the left and right axles 24, 26. For example, a plurality of intermediate clutch disks 76 are slidably keyed by mean of radially inwardly projecting teeth to the right end portion of the sun gear teeth surrounding its midsection 58. As was mentioned before, the sun gear 56 is splined to the right axle 26. The linkage or torque path between the alternate clutch disks 74 and axle 24 includes the right side case member 34, the left side case member 32, the annular gear 36 and the planetary wheel assembly 40. First of all the clutch disks 74 are slidably keyed to the right side case member 34. In the FIG. 1 embodiment the number of alternate disks 74 linked to the left axle 24 exceeds the number of intermediate disks 76 linked to the right axle 76 by one. There are actually twelve disks 74 and eleven disks 76 in the illustrated clutch pack.

An axially movable clutch cage 78, having a radially disposed annular pressure plate 80 at one end, is used to apply a lateral force against an adjacent end face of the clutch pack which is sandwiched between the pressure plate 80 and an opposing annular clutch surface on the inside of case member 34. The clutch cage 78 has a plurality of parallel legs 82 which are integrally attached to the periphery of the pressure plate 80 and extend laterally to the right through apertures in the side wall of right side case member 34. An annular steel armature 84, spaced in close proximity to the outside surface of case member 34, is connected by threaded fasteners to the protruding ends of cage legs 82. Compression springs 86 contained in opposed recesses in the confronting faces of the case side wall and armature resiliently bias the armature and cage axially to the right. This results in a light or trace preload pressure being applied to the clutch pack. However, the preload pressure is light enough not to cause significant frictional resistance between adjoining clutch disks 74, 76.

An annular electromagnet 87 is mounted in a fixed position inside of the differential housing 12 adjacent to the annular armature 84. It is symmetrically disposed with respect to the armature and the confronting face of these two components are spaced an effective distance from each other so that when the electromagnet is energized the armature and attached clutch cage will be drawn towards the electromagnet. This reaction compresses the clutch pack and increases the resistance to relative rotation between adjoining clutch disks 74, 76 and likewise between the components keyed to them. Activation of the electomagnet and regulation of the intensity of the magnetic field occur preferably by means of electronic controls or alternatively as a result of driver intervention. Electrical wires 88, 89 extend outwardly from the electromagnet 87 to an external control (not shown) which is accessible to the vehicle operator.

Figure 3:
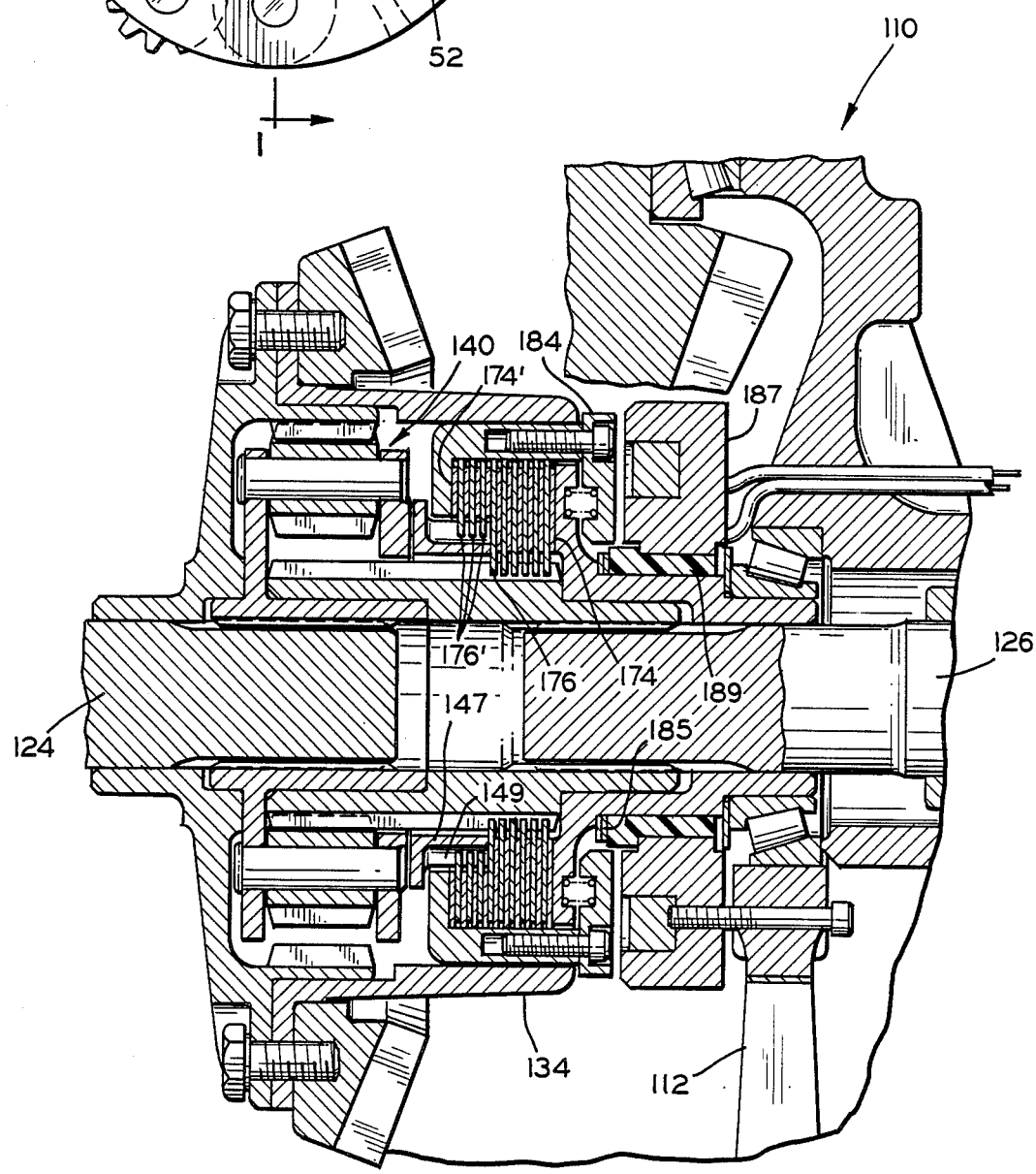
FIG. 3 is a sectional plan view similar to FIG. 1 but of another embodiment of the invention.
Figure 4:
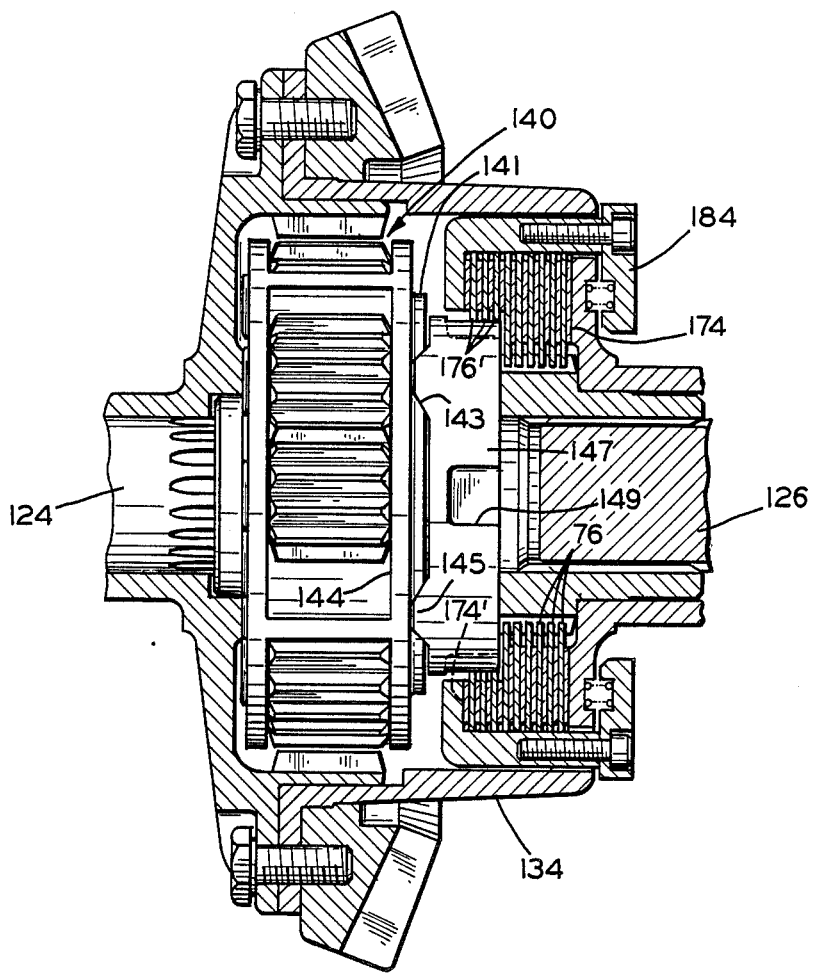
FIG. 4 is a partially sectioned view similar to FIG. 1 showing details of the supplemental clutch mechanism.
Figure 5:
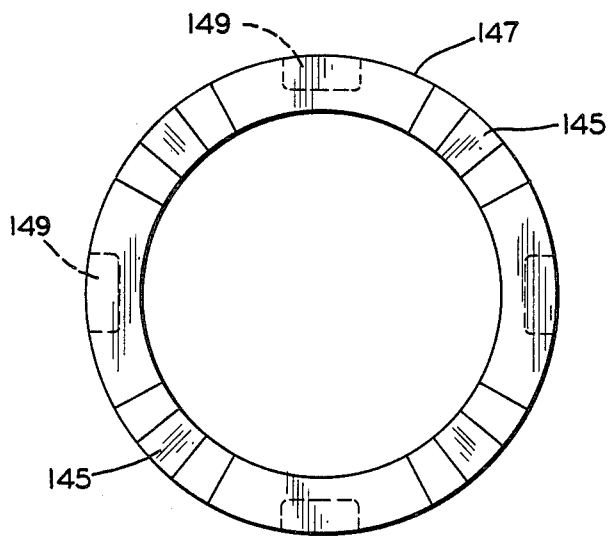
FIG. 5 is an end view of an annular cam member of the supplemental clutch mechanism showing details of the cam teeth elements on its face.

Now referring to FIG. 3 of the drawings, the differential assembly embodiment 110 illustrated in this Fig. and the following Figs. is basically the same as the previously described embodiment 10 except for modifications relation to the inclusion of a cam operated supplemental clutch mechanism. The planetary wheel assembly 140 has been modified by the addition of an annular face cam member 141 integrally connected to the outside of right side plate 144 of assembly 140. A plurality of radially disposed truncated V-shaped cam elements in the form of grooves 143 are provided on the otherwise planar face of member 141. These cam grooves 143 are mated with an equal number of similarly shaped cam lobes or teeth 145 formed on the face end of a relatively rotatable annular cam collar member 147 (see FIG. 5). The cam slopes on opposite sides of each tooth are mirror images of one another. The effective angles of these cam slopes, measured in a circumferential direction with respect to the adjoining planar face portion of member 147, decrease slightly in a radially outward direction. Preferably the mean angle of the slope is in the range from 20° to 30° and in the instant case is 25°. The slopes may be contoured or skewed so as to provide surface rather than line contact between the mating cam elements.

Cam collar member 147 is mounted concentrically alongside cam element 141 and has a generally cylindrical body which extends axially from its cam face end to a clutch face end. It also has a plurality of rectangular grooves 149 formed in its periphery. These grooves extend from the clutch face end laterally towards the cam end of the body and are provided to slidably contain radially inwardly projecting clutch disk lugs of intermediate clutch disks 176'. The body of cam collar member 145 protrudes into the left end of the clutch pack through a first group of clutch disks comprising four alternate clutch disks 174' and three intermediate clutch disks 176'. Clutch disks 174' are slidably keyed to the right side case member 134 by radially outwardly extending lugs on their peripheries. The clutch face end of the cam body is adapted to bear against the left side of an intermediate clutch disk 176 which is the first disk of a second group of clutch pack disks. The second group is located on the right of the first group and includes alternate disks 174. Clutch disks 174, 176 are respectively linked to left and right axles 124, 126. It is to be noted that the electromagnetic clutch system operates directly on the clutch disks 174, 176, 174' 176' of both groups whereas the cam system operates directly on the clutch disks 174, 176 of the second group only. During normal operation of a vehicle traveling in a straight path on a dry road, there is no differential rotation and the cam teeth are fully seated in the cam grooves. To assure proper seating, clearance are provided between the opposing planar face portions of the cam members and between the flat truncated portions of the teeth and grooves. There is also a minimal clearance between the clutch face end of the cam collar and the adjacent disk 176. Under adverse conditions when excessive differential rotation occurs, the electromagnet is energized to an appropriate degree and a corresponding side pressure is applied to the clutch pack to effectively resist the relative rotation between adjoining clutch disks. As a result of this resistance the cam collar begins to rotate relative to the opposing cam member. This in turn causes the teeth to be displaced axially from their fully seated position in the cam grooves and moves the cam collar to the right thus applying an additional lateral force on the clutch disks 176, 174.

The annular electromagnet 187, in addition to being affixed to a rigid post of the outer housing 112 is supported on a plastic bushing 189 journaled on a cylindrical end of the right differential case section 134. The air gap between the face of the electromagnetic and the confronting face of the annular steel armature 184 is adjusted by means of annular shims 185 disposed between the left side of the bushing 189 and an opposing shoulder on the right side case member 134.

Although the invention has been described with respect to two embodiments, both of which involve planetary gear wheel types of differentials, it is to be understood that the invention can be practiced with conventional bevel gear types of automotive differentials if compactness is not essential. Futhermore it is to be understood that even though spur gears are illustrated in the drawings, gears having other teeth configurations, such as helical gears, can be used. Accordingly, the scope of the invention is to be determined primarily by the appended claims.

What is claimed is:

1. A limited slip differential gear assembly for driving each axle of a pair of coaxially aligned vehicle axles at the same relative speed and at relatively different speeds under various conditions, said assembly comprising: an outer housing, a differential gear mechanism rotatably mounted in said housing, means for connecting said axles to said differential gear mechanism, said differential gear mechanism having component parts operatively linking said axles to one another such that one axle can rotate relative to the other, said component parts having at least two members which rotate relative to each other during relative rotation between said axles, a clutch means capable of producing a variable resistance to differential rotation of said axles, said clutch means having a plurality of annular clutch disks with alternate disks being keyed to one of said two members and intermediate disks keyed to the other of said two members, said clutch disks being collectively designated as a clutch pack, said clutch means having a means for applying a remotely controllable first variable force laterally against the entire clutch pack to increase resistance to rotation between adjacent disks, and means for applying a supplemental force laterally against only some of said disks, said supplemental force applying means being responsive to continuing relative rotation of said axles after said first force has been applied.

2. A limited slip differential gear assembly according to claim 1 wherein said means for applying a supplemental force includes a rotatable annular cam member slidably keyed to some of said intermediate disks.

3. A limited slip differential gear assembly according to claim 2 wherein said clutch pack is divided into a first group of alternate and intermediate disks and a second group of alternate and intermediate disks, said means for applying a first variable force operates against both groups and includes an electromagnet, and said cam member is activated by said second group and operates only against said first group.

4. A limited slip differential gear assembly according to claim 3 wherein said intermediate disks of said second group are slidably keyed to said cam member.

5. A limited slip differential gear assembly according to claim 2 wherein one end face of said annular cam member has a clutch plate surface for bearing against one of said intermediate disks and the opposite end face of said cam member has a plurality of radially disposed cam elements which cooperate wit corresponding cam elements formed on a confronting face of another differential component member.

6. A limited slip differential gear assembly according to claim 5 wherein said cam elements are generally V-shaped mating teeth and notches, and the angles of their opposite side slopes are equal and in a range of 20°-30° relative to the otherwise planar faces of said cam members.

7. A limited slip differential gear assembly according to claim 1 wherein said means for applying said first variable force is an electromagnet means which includes a stationary electromagnet affixed to the inside of said outer housing, a coaxially disposed rotatable annular steel armature spaced by an air gap an effective distance from said electromagnet, said armature being disposed between said electromagnet and said differential gear mechanism, a clutch cage containing said clutch pack, said clutch cage being affixed to said armature by means of legs and fasteners, and an annular pressure plate integrally connected to the distal ends of said legs.

8. A limited slip differential gear assembly for driving each axle of a pair of coaxially aligned vehicle axle at the same relative speed and at relatively different speeds under various conditions, said assembly comprising: an outer housing, a differential gear mechanism rotatably mounted in said housing, means for connecting said axles to said differential gear mechanism, said differential gear mechanism having component parts operatively linking said axles to one another such that one axle can rotate relative to the other, said component parts having at least two members which rotate relative to each other during relative rotation between said axles, said differential gear mechanism includes a surrounding case formed of two separable case members affixed together by threaded fasteners and load bearing dowel pins, a remotely controllable clutch means capable of producing a variable resistance to differential rotation of said axles, said clutch means having a plurality of annular clutch disks with alternate disks being keyed to one of said two relatively rotatable members and intermediate disks keyed to the other of said two rotatable members, said clutch disks being collectively designated as a clutch pack said clutch means having an electromagnet means for applying a first variable force laterally against said clutch pack to increase resistance to rotation between adjacent disks, said electromagnet means includes a stationary electromagnetc affixed to the inside of said outer housing, an annular steel armature disposed on the outside of one of said case members, said armature being spaced by an air gap an effective distance from said electromagnet and coaxially disposed with respect thereto, a clutch cage containing said clutch pack, said clutch cage being connected to said armature by means of legs and fasteners, said legs extend through apertures in a side wall of said one case member to an annular pressure plate integrally connected to the distal ends of said legs, compression springs disposed between said armature and said one case members provide a trace preload on said clutch pack, and means for applying a supplemental force laterally against at least some of said disks in the event of continuing relative rotation of said axles after said first force has been applied.

9. A limited slip differential gear assembly according to claim 8 wherein said electromagnet is mounted on a concentric bushing surrounding an end portion of said case, and said air gap is selectively set by means of annular shims disposed between an end face of said bushing and said case.

10. A limited slip differential gear assembly for driving each axle of a pair of coaxially aligned vehicle axes at the same relative speed and at different relative speeds under various conditions, said assembly comprising: an outer housing, a differential gear case rotatably supported on bearings in said housing, an annular gear with inwardly facing teeth integrally formed on the inside of said case, a coaxially disposed planetary wheel assembly having a plurality of spaced apart pairs of meshed planet gears rotatably mounted on parallel transverse pins, one gear of each pair being mounted closer to the wheel periphery than the other gear of each pair, the outer gear of each pair meshing with said annular gear, a coaxially disposed sun gear meshing with the innermost gear of each pair of planet gears, and a remotely controllable electromagnetic clutch means having a plurality of annular clutch disks disposed side-by-side with alternate disks slidably keyed respectively to said sun gear and said case, said clutch means includes a clutch cage on t he inside of said gear case, said cage having a pressure plate, a plurality of spaced apart parallel legs integrally attached to the periphery of said pressure plate, said legs extending through apertures in the sidewall of said case to an annular steel armature disposed coaxially on the outside of said case where the free ends of said legs are affixed to said armature, a means for providing a trace preload laterally against said disks, and a coaxially disposed stationary annular electromagnet spaced axially from the outside of said armature an effective distance, said electromagnet being affixed to the inside of said outer housing.

11. A limited slip differential gear assembly for driving each axle of a pair of coaxially aligned vehicle axles at the same relative speed and at different relative speeds under various conditions, said assembly comprising: an outer housing, a differential gear case rotatably supported on bearings in said housing, an annular gear with inwardly facing teeth integrally formed on the inside of said case, a coaxially disposed planetary wheel assembly having a plurality of spaced apart pairs of meshed planet gears rotatably mounted on parallel transverse pins, one gear of each pair being mounted closer to the wheel periphery than the other gear of each pair, the outer gear of each pair meshing with said annular gear, a coaxially disposed sun gear meshing with the innermost gear of each pair of planet gears, and a clutch means having a plurality of annular clutch disks disposed side-by-side with alternate disks slidably keyed respectively to said sun gear and said case, said clutch means includes a clutch cage having a pressure plate, a plurality of spaced apart parallel legs integrally attached to the periphery of said pressure plate, said legs extending through apertures in the side wall of said case to annular steel armature disposed on the outside of said case where the free ends of said legs are affixed to said armature, a plurality of compression springs contained in sockets on the opposing faces of said armature and case, and a stationary annular electromagnet spaced axially form the outside of said armature an effective distance.

12. A limited slip differential gear assembly for driving each axle of a pair of coaxially aligned vehicle axles at the same relative speed an at different relative speeds under various conditions, said assembly comprising: an outer housing, a differential gear case rotatably supported on bearings in said housing, an annular gear with inwardly facing teeth integrally formed on the inside of said case, a coaxially disposed planetary wheel assembly having a plurality of spaced apart pairs of meshed planet gears rotatably mounted on parallel transverse pins, one gear of each pair being mounted closer to the wheel periphery than the other gear of each pair, the outer gear of each pair meshing with said annular gear, a coaxially disposed sun gear meshing with the innermost gear of each pair of panel gears, and a clutch means having a plurality of annular clutch disks disposed side-by-side with alternate disks slidably keyed respectively to said sun gear and said case, said clutch means includes means for applying a first lateral force against all of said disks and another means for applying a second force against only some of said disks.

13. A limited slip differential gear assembly according to claim 12 wherein said another means includes an annular face cam member on the side of said planetary wheel assembly, and a cooperating annular cam collar member having cam elements on its adjoining end face.

14. A limited slip differential gear assembly according to claim 13 wherein said plurality of disks are divided into a first group and a second group, said cam collar member extends through said first group and is slidably keyed to some of said disks in said first group.

15. A limited slip differential gear assembly according to claim 12 wherein said means for applying a first lateral force is electromagnetically operated and said means for applying a second lateral force is cam operated.

16. A limited slip differential gear assembly according to claim 12 wherein said means for applying a second lateral force includes relatively rotatable cam members having cooperating cam elements formed on opposing faces of said members.

17. A limited slip differential gear assembly according to claim 16 wherein relative rotation between said cam members is initiated by said first lateral force.

* * * * *